United States Patent [19]

Sakai

[11] Patent Number: 5,699,533
[45] Date of Patent: Dec. 16, 1997

[54] CONNECTION APPARATUS FOR MAGNETIC DISK DEVICE

[75] Inventor: Tomohiro Sakai, Tokyo, Japan

[73] Assignee: NEC Corporation, Japan

[21] Appl. No.: 669,595

[22] Filed: Jun. 24, 1996

[30] Foreign Application Priority Data

Jun. 28, 1995 [JP] Japan .................... 7-162541

[51] Int. Cl.$^6$ .................................. H01J 13/00
[52] U.S. Cl. .................. 395/311; 395/287; 395/312; 395/200.03; 395/858; 395/438; 395/439; 395/441; 395/672; 395/674
[58] Field of Search .................... 395/311, 312, 395/309, 287, 856, 857, 858, 200.03, 200.12, 200.2, 438, 439, 441, 281, 822, 670, 672, 674, 675

[56] References Cited

U.S. PATENT DOCUMENTS

| | | | |
|---|---|---|---|
| 5,239,632 | 8/1993 | Larner | 395/311 |
| 5,297,262 | 3/1994 | Cox et al. | 395/821 |
| 5,420,988 | 5/1995 | Elliott | 395/821 |
| 5,454,085 | 9/1995 | Gajjar et al. | 395/285 |
| 5,465,355 | 11/1995 | Cook et al. | 395/858 |
| 5,572,659 | 11/1996 | Iwasa et al. | 395/182.04 |
| 5,581,709 | 12/1996 | Ito et al. | 395/858 |
| 5,603,062 | 2/1997 | Sato et al. | 395/872 |
| 5,621,899 | 4/1997 | Gafford et al. | 395/299 |

*Primary Examiner*—Jack B. Harvey
*Assistant Examiner*—Raymond N. Phan
*Attorney, Agent, or Firm*—Hayes, Soloway, Hennessey, Grossman & Hage, P.C.

[57] ABSTRACT

A connection apparatus for a magnetic disk device is connected between a plurality of host devices and a plurality of drive devices and includes a plurality of bus connection control units respectively provided in correspondence with the host devices. Each of the bus connection control units includes a first protocol controller for individually communicating with one of the host devices by using a small computer system interface (SCSI) bus, a plurality of second protocol controllers for respectively communicating with the drive devices by using SCSI buses, a switching circuit for switching connection between the first protocol controller and the second protocol controllers, and a control circuit for, when a command including the logical unit number of a drive device is generated from one of the host devices, controlling the switching circuit in accordance with the logical unit number and switching the first protocol controller to one of the second protocol controllers regardless of another connection between the host device and the drive device. Each of the drive devices is respectively connected to the second protocol controllers corresponding to the bus connection control units via the common SCSI bus.

7 Claims, 3 Drawing Sheets

CONNECTION APPARATUS FOR MAGNETIC DISK DEVICE

BACKGROUND OF THE INVENTION

The present invention relates to a connection apparatus for connecting host devices and magnetic disk devices via SCSI (Small Computer System Interface) buses.

As external memory devices for storing programs and data, floppy disk devices and hard disk devices are generally prepared for most of the host devices. These external memory devices have been reduced in size and increased in capacity rapidly, and use higher intelligent SCSIs as standard interfaces for connection to host devices.

FIG. 3 shows an example of a conventional connection scheme for magnetic disk devices and host devices.

As shown in FIG. 3, the conventional connection scheme for connecting host devices and magnetic disk devices (SCSI drive devices) via a SCSI constitutes a multi-initiator/multi-target system by commonly connecting a plurality of host devices 10a to 10d and a plurality of magnetic disk devices (SCSI drive devices) 20a to 20d to one SCSI bus 30 and assigning individual identifiers (IDs) to the plurality of host devices 10a to 10d and the plurality of SCSI drive devices 20a to 20d.

Since a plurality of initiators simultaneously access a plurality of targets in a multiprocessing operating system (OS), a certain access sometimes waits for release of a bus which connects an initiator and a target. For this reason, when no data is transferred upon issuing a command, the initiator and the target are temporarily disconnected (selection release) to release the bus, and then they are reselected to resume a command. In this manner, the bus occupation time is shortened to improve the bus use efficiency.

In the above-described conventional connection scheme, the plurality of host devices 10a to 10d and the plurality of SCSI drive devices 20a to 20d are commonly connected to one SCSI bus 30. When one pair of a host device and a SCSI drive device use the SCSI bus 30 for data transfer or the like, the remaining host devices and SCSI drive devices must wait until the SCSI bus 30 is released.

SUMMARY OF THE INVENTION

It is an object of the present invention to provide a connection apparatus for magnetic disk devices in which the operating ratio of the devices is increased.

In order to achieve the above object, according to the present invention, there is provided a connection apparatus for a magnetic disk device wherein the apparatus is connected between a plurality of host devices and a plurality of drive devices and comprises a plurality of bus connection control units respectively provided in correspondence with the host devices, each of the bus connection control units comprising first protocol control means for individually communicating with one of the host devices by using a small computer system interface (SCSI) bus, a plurality of second protocol control means for respectively communicating with the drive devices by using SCSI buses, each of the drive devices being connected to the second protocol control means corresponding to the bus connection control units via the common SCSI bus, switching means for switching connection between the first protocol control means and the second protocol control means, and control means for, when a command including a logical unit number of a drive device is generated from one of the host devices, controlling the switching means in accordance with the logical unit number and switching the first protocol control means to one of the second protocol control means regardless of another connection between the host device and the drive device.

DESCRIPTION OF THE PREFERRED EMBODIMENT

An embodiment of the present invention will be described below with reference to the accompanying drawings.

Figure 1:
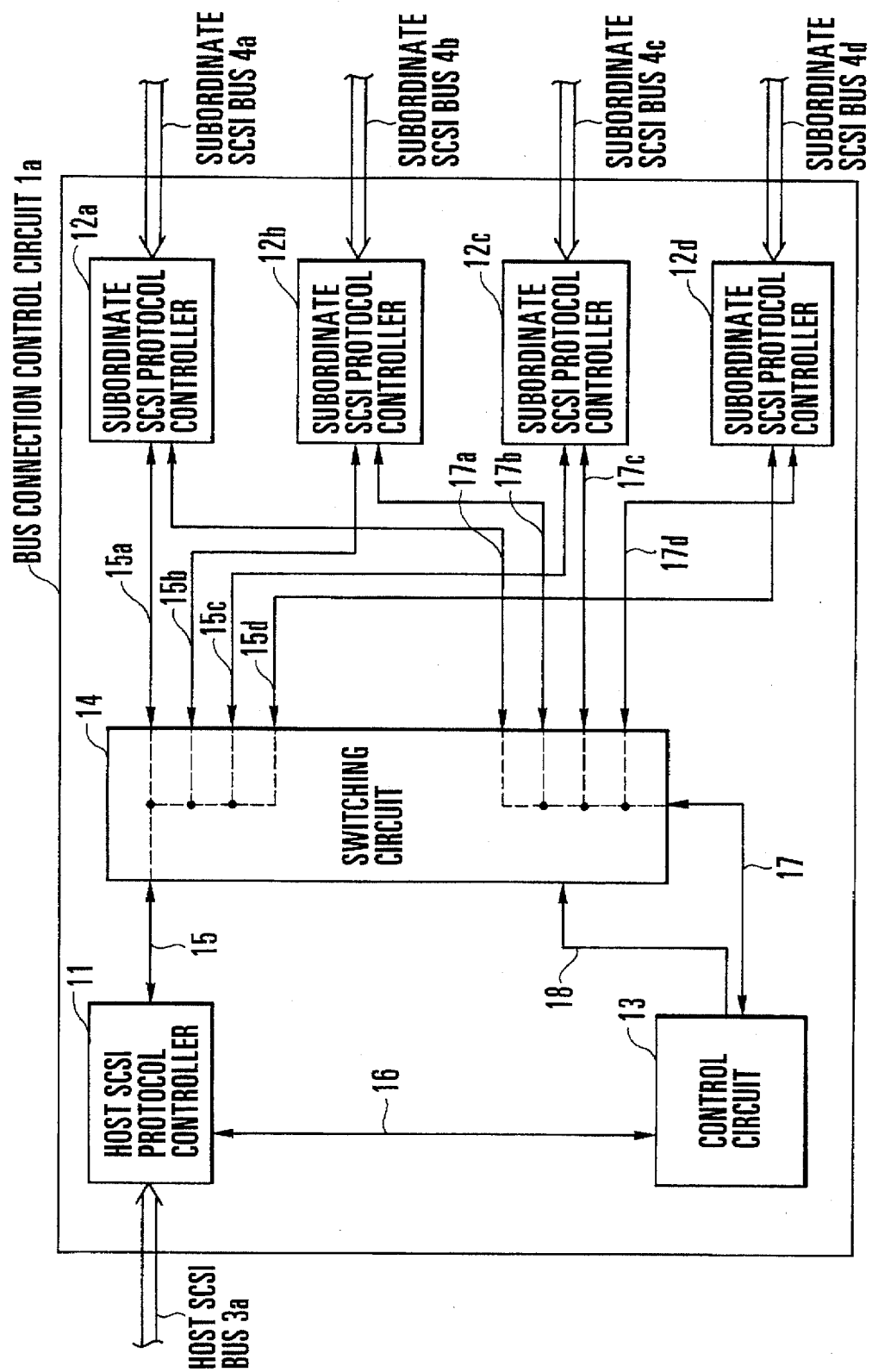
FIG. 1 is a block diagram showing a bus connection control circuit shown in FIG. 2.
Figure 2:
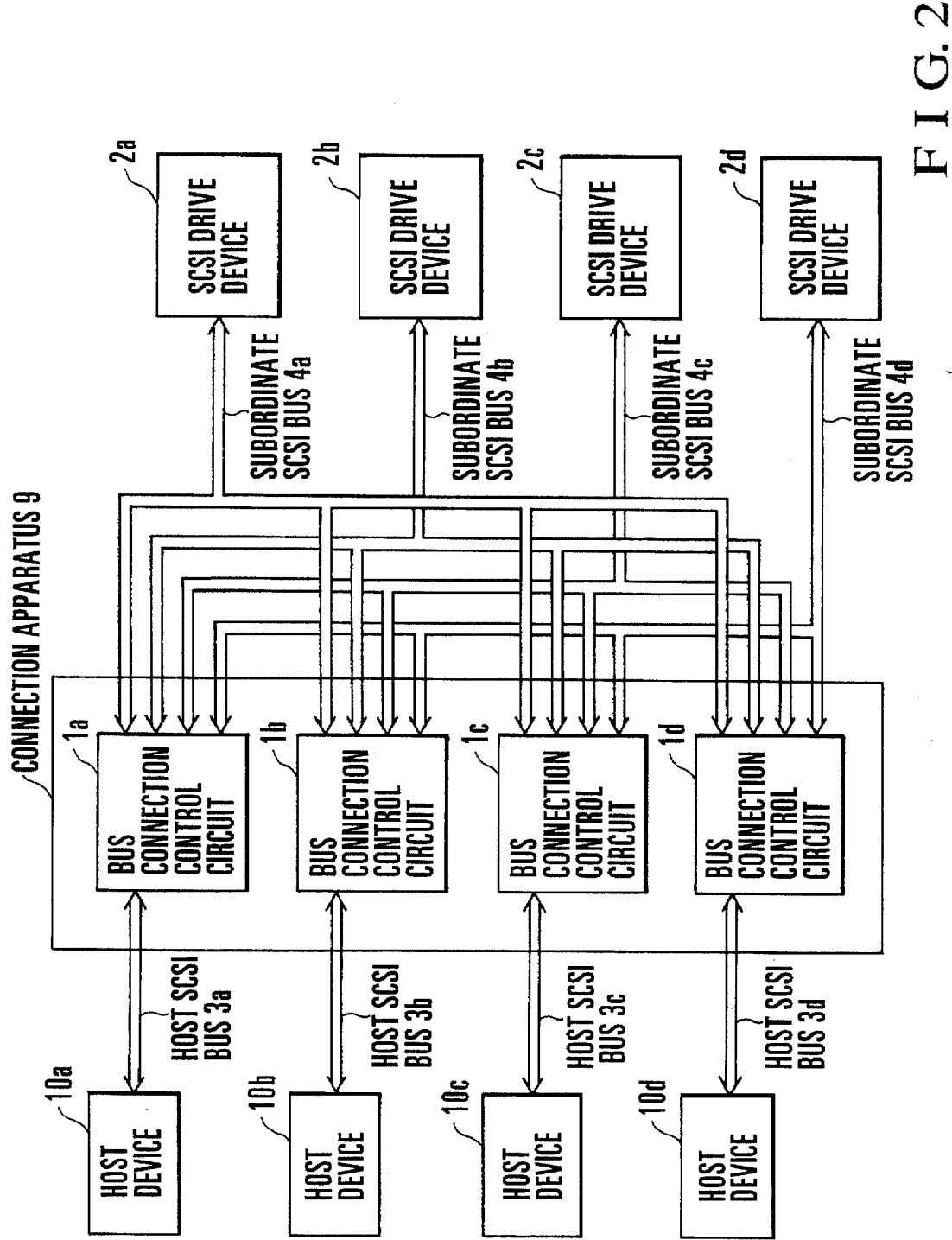
FIG. 2 is a block diagram showing a connection apparatus for magnetic disk devices according to an embodiment of the present invention.
Figure 3:
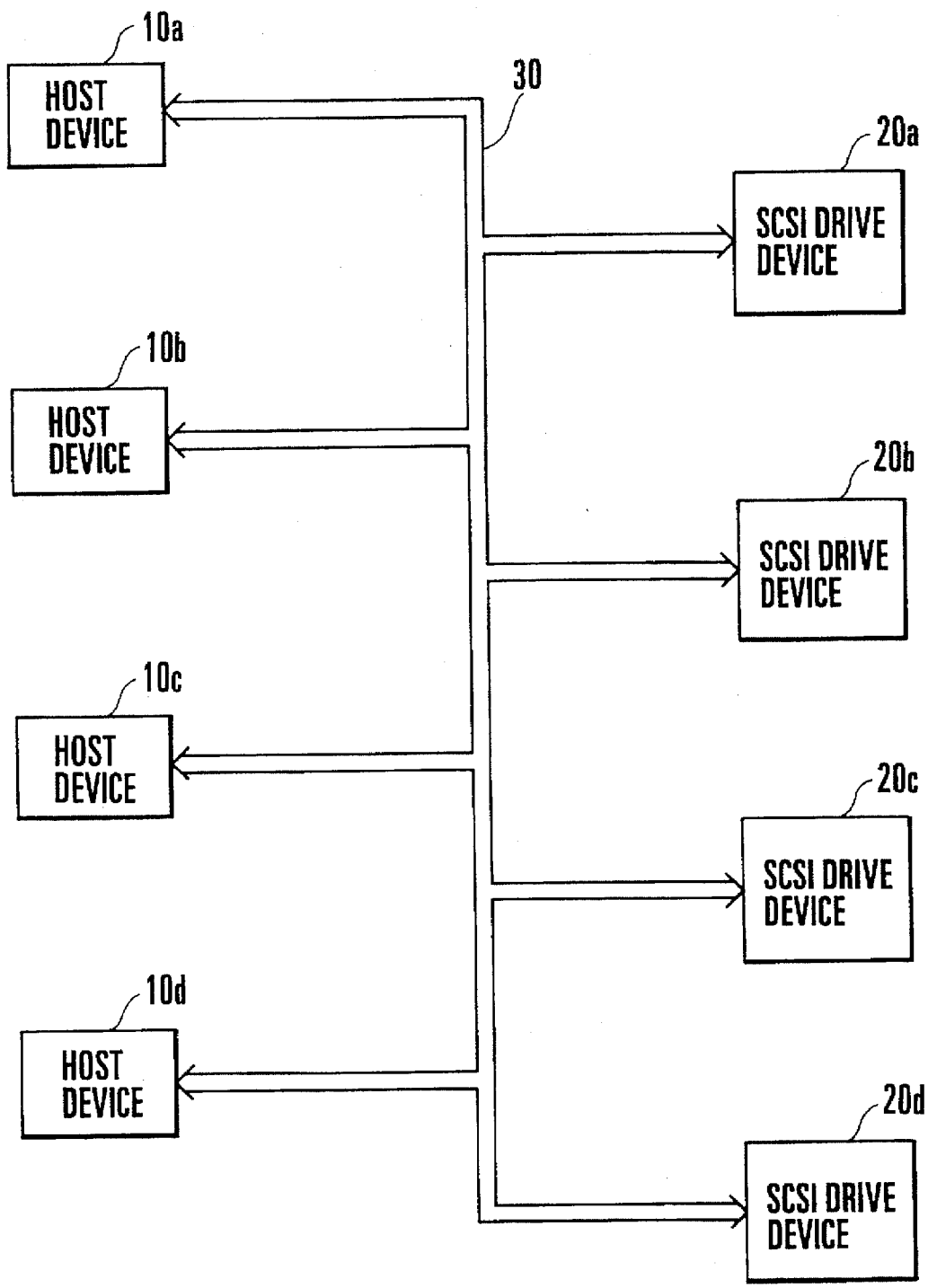
FIG. 3 is a block diagram showing conventional connection between magnetic disk devices and host devices.

FIG. 1 shows a bus connection control circuit in FIG. 2 in detail, and FIG. 2 shows a connection apparatus for magnetic disk devices according to an embodiment of the present invention.

As shown in FIG. 2, a connection apparatus 9 for magnetic disk devices comprises four bus connection control circuits 1a to 1d having the same arrangement.

Each of the bus connection control circuits 1a to 1d has an arrangement as shown by the bus connection control circuit 1a as a representative in FIG. 1. That is, a host SCSI protocol controller 11 communicates with a host device 10a via a host SCSI bus 3a. Subordinate SCSI protocol controllers 12a to 12d communicate with SCSI drive devices 2a to 2d for driving magnetic disk devices, via subordinate SCSI buss 4a and 4d, respectively. A switching circuit 14 which operates by a command from a control circuit 13 is provided between the host SCSI protocol controller 11 and the subordinate SCSI protocol controllers 12a to 12d.

The host SCSI protocol controller 11 and the switching circuit 14 are connected via a data line 15, and the switching circuit 14 and the subordinate SCSI protocol controllers 12a to 12d are connected via data lines 15a to 15d. The SCSI control circuit 13 and the switching circuit 14 are connected via a subordinate SCSI control line 17, and the switching circuit 14 and the subordinate SCSI protocol controllers 12a to 12d are connected via subordinate SCSI control lines 17a to 17d. The host SCSI protocol controller 11 and the subordinate SCSI protocol controllers 12a to 12d exchange data via the switching circuit 14 and the data lines 15 and 15a to 15d.

The control circuit 13 controls the operation of the host SCSI protocol controller 11 via a host SCSI control line 16 and controls the operations of the subordinate SCSI protocol controllers 12a to 12d via the subordinate SCSI control lines 17 and 17a to 17d and the switching circuit 14. The SCSI control circuit 13 also controls the operation of the switching circuit 14 via a subordinate SCSI switching control line 18. The switching circuit 14 which has received a command from the control circuit 13 via the subordinate SCSI switching control line 18 selects one to be connected to the host SCSI protocol controller 11 from the subordinate SCSI protocol controllers 12a to 12d. Then, the switching circuit 14 connects, to the data line 15 and the subordinate SCSI control line, one of the data line 15a to 15d and one of the subordinate SCSI control lines 17a to 17d corresponding to the selected subordinate SCSI protocol controller, respectively.

In FIG. 2, the four bus connection control circuits 1a to 1d are connected to the host device 10a and host devices 10b to 10d via the host SCSI bus 3a and host SCSI buses 3b to 3d, respectively. Each of the bus connection control circuits 1a to 1d is connected to the four SCSI drive devices 2a to 2d via the subordinate SCSI buses 4a to 4d.

Next, the operation of the connection apparatus 9 for magnetic disk devices which has the above-described arrangement will be described.

First of all, assignation of identifiers (IDs) will be explained.

Since the initiator and target of each of the host SCSI buses 3a to 3d are in a one-to-one correspondence, and the host SCSI buses 3a to 3d of the host devices 10a to 10d are separated from each other, four sets of IDs respectively assigned to the bus connection control circuits 1a to 1d can be the same. An ID of "7" is assigned to the host devices 10a to 10d, and an ID of "0" is assigned to the host SCSI protocol controllers 11 of the respective bus connection control circuits 1a to 1d. Although there are four sets of the subordinate SCSI buses 4a to 4d, the four subordinate SCSI buses 4a to 4d are separated from each other in one bus connection control circuit. For this reason, the subordinate SCSI protocol controllers 12a to 12d in each of the four bus connection control circuits 1a to 1d may have the same ID and the SCSI drive devices 2a to 2d may have the same ID for the four bus connection control circuits 1a to 1d. Since one SCSI drive device is connected to the four bus connection control circuits 1a to 1d, different IDs must be assigned to the respective sets of the subordinate SCSI protocol controllers 12a to 12d in the bus connection control circuits 1a to 1d. Therefore, an ID of "0" is assigned to all the four SCSI drive devices 2a and 2d. As for the ID of each set of the subordinate SCSI protocol controllers 12a to 12d, "7" is assigned to the subordinate SCSI protocol controllers 12a to 12d of the bus connection control circuit 1a; "6" is assigned to those of the bus connection control circuit 1b; "5" is assigned to those of the bus connection control circuit 1c; and "4" is assigned to those of the bus connection control circuit 1d.

In addition, individual logical unit numbers (LUNs) are assigned to the SCSI drive devices 2a to 2d, respectively. For example, a logical unit number (LUN) of "0" is assigned to the SCSI drive device 2a; an LUN of "1" is assigned to the SCSI drive device 2b; an LUN of "2" is assigned to the SCSI drive device 2c; and an LUN of "3" is assigned to the SCSI drive device 2d.

For example, the host device 10a having an ID of "7" issues a command to the host SCSI protocol controller 11 having an ID of "0" in the bus connection control circuit 1a. At this time, one of the SCSI drive devices 2a to 2d to be accessed is designated in accordance with an LUN in an identification message. For example, when the LUN is "0", the SCSI drive device 2a is designated.

The control circuit 13 samples, via the host SCSI control line 16, the LUN received by the host SCSI protocol controller 11 and supplies it to the switching circuit 14 via the subordinate SCSI switching control line 18 to switch connection between the data line 15 and the data lines 15a to 15d and connection between the subordinate SCSI control line 17 and the subordinate SCSI control lines 17a to 17d. In this case, the subordinate SCSI protocol controller 12a connecting the SCSI drive device 2a having an LUN of "0", the host SCSI protocol controller 11, and the control circuit 13 can communicate with each other.

The control circuit 13 instructs the subordinate SCSI protocol controller 12a having an ID of "7" in the bus connection control circuit 1a to issue a command to the SCSI drive device 2a having an ID of "0" With this operation, line connection between the host device 10a and the SCSI drive device 2a is established, and data is exchanged via the data lines 15 and 15a to execute the command.

When the subordinate SCSI protocol controller 12a receives information of the end of the command execution from the SCSI drive device 2a, the control circuit 13 instructs the host SCSI protocol controller 11 to inform the host device 10a of the end of the command execution.

During executing a command between the host device 10a and the SCSI drive device 2a, commands can be executed between the remaining host devices 10b to 10d and the remaining SCSI drive devices 2b to 2d. For example, the host device 10b having an ID of "7" issues a command to the host SCSI protocol controller 11 having an ID of "0" in the bus connection control circuit 1b to designate the SCSI drive device 2b having an LUN of The control circuit 13 of the bus connection control circuit 1b instructs the subordinate SCSI protocol controller 12b having an ID of "6" and connecting the SCSI drive device 2b having a LUN of "1" to issue a command. With this operation, line connection between the host device 10b and the SCSI drive device 2b is established, so that the command can be executed.

The same operation can be applied to remaining combinations except for the case of connection requests to the same SCSI drive device.

The above-described embodiment exemplifies the case in which four bus connection control circuits are respectively connected to host devices and four SCSI drive devices are commonly connected to the four bus connection control circuits. However, a maximum of seven bus connection control circuits can be connected to one host device, a maximum of eight SCSI drive devices can be connected to one bus connection control circuit, and one SCSI drive device can be connected to a maximum of seven bus connection control circuits. For this reason, in the maximum combination, seven host devices can access 56 common SCSI drive devices.

As has been described above, a connection apparatus for magnetic disk devices according to the present invention comprises a plurality of bus connection control circuits each having one host SCSI protocol controller, a plurality of subordinate SCSI protocol controllers respectively connecting a plurality of SCSI drive devices, a switching circuit for switching connection between the host SCSI protocol controller and the subordinate SCSI protocol controllers, and a control circuit for controlling the operation of the switching circuit. A plurality of host devices and the plurality of SCSI drive devices can be arbitrarily combined and accessed by individually connecting the host devices to corresponding host SCSI protocol controllers and connecting the plurality of common SCSI drive devices to the subordinate SCSI protocol controllers. Therefore, the operating ratios of the host devices and the SCSI drive devices can be increased.

What is claimed is:

1. A connection apparatus for a magnetic disk device wherein said apparatus is connected between a plurality of host devices and a plurality of drive devices and comprises a plurality of bus connection control units respectively provided in correspondence with said host devices, each of said bus connection control units comprising:
first protocol control means for individually communicating with one of said host devices by using a small computer system interface (SCSI) bus;

a plurality of second protocol control means for respectively communicating with said drive devices by using common SCSI buses, each of said drive devices being connected to said plurality of second protocol control means corresponding to said bus connection control units via said common SCSI bus;

switching means for selectively switching connection between said first protocol control means and said second protocol control means; and control means for, when a connection request command including a logical unit number of a drive device is generated from one of said host devices, controlling said switching means in accordance with the logical unit number and switching said first protocol control means to one of said second protocol control means corresponding to the requested drive device regardless of connection between other host devices and other drive devices.

2. An apparatus according to claim 1, wherein each of said bus connection control units comprises a first control line for connecting said control means and said switching means, and a plurality of second control lines for connecting said switching means and said second protocol control means, and said switching means interlocks with switching connection between said first and second protocol control means to switch and connect said first control line to a corresponding one of said second control lines.

3. An apparatus according to claim 1, wherein the number of said host devices equals the number of said bus connection control units, and the number of said drive devices equals the number of said second protocol control means.

4. An apparatus according to claim 1, wherein identification codes are assigned to said host devices and said first and second protocol control means in advance, different identification codes are assigned to at least said second protocol control means in each of said bus connection control units, and connection between said host devices and said drive devices is controlled in accordance with logical unit numbers of said drive devices and the assigned identification codes.

5. An apparatus according to claim 2, wherein each of said bus connection control units comprises a third control line for connecting first protocol control means and said control means, said first protocol control means informs said control means via said third control line of the logical unit number of said drive device included in the command sent from said host device, and said control means controls switching of said first protocol control means and said control means to one of said second protocol control means in accordance with the informed logical unit number.

6. A connection apparatus for a magnetic disk device wherein said apparatus is connected between a plurality of host devices and a plurality of drive devices and comprises a plurality of bus connection control units respectively provided in correspondence with said host devices, each of said bus connection control units comprising:

a first protocol control means for individually communicating with one of said host devices by using a small computer system interface (SCSI) bus;

a plurality of second protocol control means for respectively communicating with said drive devices by using common SCSI buses, each of said drive devices being connected to said plurality of second protocol control means corresponding to said bus connection control units via said common SCSI bus;

switching means for switching connection between said first protocol control means and said second protocol control means; and control means for, when a command including a logical unit number of a drive device is generated from one of said host devices, controlling said switching means in accordance with the logical unit number and switching said first protocol control means to one of said second protocol control means regardless of another connection between said host device and said drive device, and wherein each of said bus connection control units comprises a first control line for connecting said control means and said switching means, and a plurality of second control lines for connecting said switching means and said second protocol control means, and said switching means interlocks with switching connection between said first and second protocol control means to switch and connect said first control line to a corresponding one of said second control lines, and wherein each of said bus connection control units further comprises a third control line for connecting first protocol control means and said control means, said first protocol control means informs said control means via said third control line of the logical unit number of said drive device included in the command sent from said host device, and said control means controls switching of said first protocol control means and said control means to one of said second protocol control means in accordance with the informed logical unit number.

7. An apparatus according to claim 6, wherein identification codes are assigned to said host devices and said first and second protocol control means in advance, different identification codes are assigned to at least said second protocol control means in each of said bus connection control units, and connection between said host devices and said drive devices is controlled in accordance with logical unit numbers of said drive devices and the assigned identification codes.

* * * * *